Nov. 6, 1962 P. S. MARTIN 3,062,441

COUNTERS AND READ-OUTS

Filed Aug. 6, 1959 3 Sheets-Sheet 2

Nov. 6, 1962 P. S. MARTIN 3,062,441

COUNTERS AND READ-OUTS

Filed Aug. 6, 1959 3 Sheets-Sheet 3

3,062,441
COUNTERS AND READ-OUTS
Paul S. Martin, 189—54 43rd Road, Flushing, N.Y.
Filed Aug. 6, 1959, Ser. No. 832,066
19 Claims. (Cl. 235—92)

The present invention relates to a read-out, and more particularly, to a binary counter having a read-out.

An important object of the invention resides in the provision of a novel form of read-out, for the elimination of the circuit complexity that has heretofore characterized many forms of matrix counter read-outs.

Binary counters involve a series of stages, each of which has two sides wherein one side is "on" when the other side is "off." It may be considered that when the counter is at zero, the (arbitrarily designated) left-hand sides of all the stages are "off" and the other or right-hand sides are "on." As impulses are successively applied to the input stage of the series of stages, the input stage flips so that one side changes from "on" to "off" while the other side changes from "off" to "on," and the next pulse produces a reverse change, and so on. Each time the first stage changes from one condition to the opposite, and changes back again, it passes a single impulse to the second stage. Correspondingly, the second stage must be flipped both back and forth by a pair of pulses before it transmits a single impulse to the third stage. Ultimately, the number of impulses applied to the input stage is represented by a combination of conditions at the read-out points of the binary counter stages.

Where no read-out circuit is used, the count may be determined by noting the conditions of one side of each of the counter stages. For example, a five-stage counter might have its right-hand sides "on"–"on"–"off"–"off"–"on." By memorizing the count significance of each stage and adding them, the meaning of the conditions of the stages can be determined. The above counter read-out means -1-plus-2-plus-0-plus-0-plus-16, or 19.

To avoid this process, in order to obtain a single value directly indicated by a read-out, a resistor matrix or a diode matrix can be used that will convert the combination of "on" and "off" conditions of all the stages to a significant distinctive signal at one output point. Thus a counter of $n$ stages would require a distinctive signal at one read-out point among $2^n$ individual read-out points, where $2^n$ is the total count capacity of the counter. With a binary counter having as few as eight stages, a read-out matrix would require hundreds of diodes, and individual read-out components (as lamps) at the individual read-out points. Failure of any one of the diodes somewhere in the circuit is obviously a possibility. To minimize failures, costly high-reliability diodes have been used. Considering the large number of diodes, plus a read-out device wired to each individual read-out position, it is apparent that a matrix read-out with its complex circuit and its numerous components is expensive both as to components and as to assembly, and is to a degree unreliable and difficult to repair. Accordingly, a further object of this invention is to provide a novel read-out of reduced cost, and improved reliability, and in which the location of a faulty component is facilitated by reduced number of components.

A further object resides in the provision of a novel read-out for a binary counter which will convert the pulses counted into an analogue function. A more specific related object is to provide an analogue read-out in a binary counter used for speed measurement. In such speed measuring device, "clock" pulses are fed into a counter at regular intervals through a "start" and "stop" gate, where the gate is controlled (for example) by a vehicle crossing a start line and a stop line in succession, the elapsed time being represented by the number of pulses counted; and in this connection a read-out pursuant to the invention can directly provide an analogue conversion of the elapsed time as represented by the pulses counted so that it is possible to read the count in terms of "miles per hour."

Recognition of failure of the read-out is frequently an important consideration. A feature of the present invention resides in a provision of a novel read-out in which both sides or read-out points of each binary stage participate in the read-out function, with the resulting assurance that, in the event of a failure of the read-out element at one side of any binary stage, the resulting read-out will provide evidence of such failure.

In the aforementioned application of the read-out for measurement of speed, it is known that a speed reading may be obtained visually from traffic monitoring equipment; and it may also be desirable to record the observed speed reading. This may be done photographically or otherwise at the same time that a picture is taken of the car whose speed was measured. Where it is done photographically, the recording of the speed can be effected in an area of film immediately adjacent to the image of the car so as to preclude error in associating the speed reading and the vehicle photographed. Accordingly, both display and recording functions are to be effected by the novel read-out.

The nature of the invention will be better appreciated, and further objects and features of novelty will become apparent, from the following detailed description of various embodiments thereof, shown in the accompanying drawings which form part of the disclosure of this invention.

Figure 1:
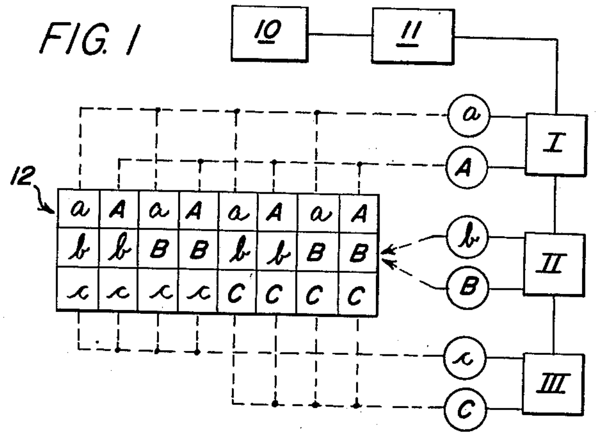
FIG. 1 is a diagram illustrating features of the invention.

Referring now to the drawings, FIG. 1 illustrates a multi-stage binary counter including stages I, II, and III, which are arranged to count pulses supplied by a clock pulse source 10 through a gate 11. Each binary read-out stage is commonly in the form of a "flip-flop" circuit, having two read-out points, such that when one read-out point is "on," the other is "off." The two read-out sides of the binary stages I, II and III are shown in circles designated "*a*" and "A" for stage I, "*b*" and "B" for stage II, and "*c*" and "C" for stage III. It may be considered that at each of these read-out points *a* A, *b* B, *c* C, etc. there is provided a small incandescent or neon lamp, or a pattern of electroluminescent areas of an electroluminescent lamp (provided with suitable gating and A.-C. supply means), or any other suitable form of display and/or recording elements.

Regardless of the form of the read-out, the read-out device at the side of stage I designated "*a*" will be arranged to register its condition in a way to produce illumination or other distinctive effect for display and/or recording in the areas correspondingly designated "*a*" in the display or recording matrix 12. Correspondingly, the other read-out point A, *b*, B, *c* and C will provide illumination or other distinctive effect in the correspondingly labeled areas in matrix 12 of FIG. 1. Matrix 12 has as many rows as there are read-out stages and ($2^n$) columns, where *n* is the number of counter stages. While shown as horizontal rows and vertical columns, the matrix may be arranged otherwise, for circular rows with radial columns is a contemplated alternative.

In the first column of matrix 12 of FIG. 1, read-out or display elements of the three sides or read-out points *a*, *b*, *c* are presented. At the extreme right hand end of the matrix, display elements of the three sides or read-out points A, B and C are presented. Between these extreme columns there are various combinations of read-out elements identified by lower-case and capital letters corresponding to the respective read-out sides of the stages I, II and III, with each column uniquely representing one condition of the combined read-out points of the three counter stages.

Figures 2, 3:
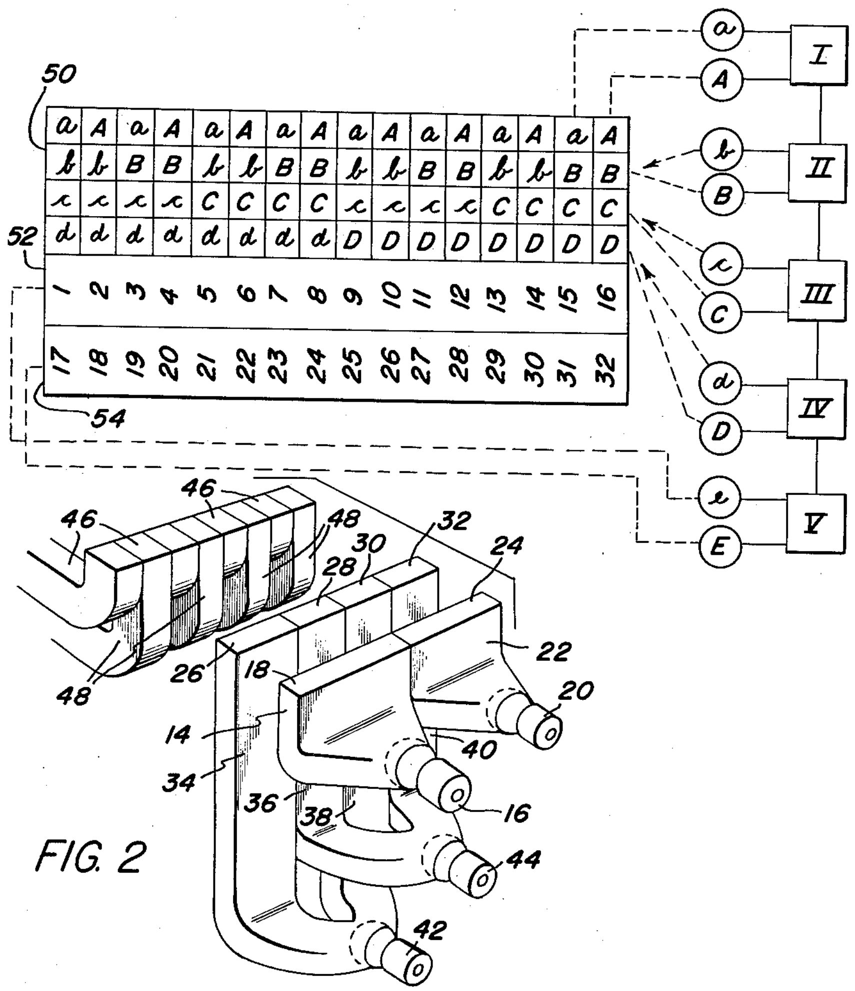
FIG. 2 is an enlarged perspective of a portion of the apparatus in FIG. 1.
FIG. 3 is a diagram similar to FIG. 1, incorporating additional features of the invention.

The matrix 12 may be constructed as is partially represented in FIG. 2, to use a series of pilot lamps and light-conducting rods as shown. Thus, a bent "Lucite" rod 14 can be used with a small incandescent lamp 16 to represent the first four columns of the bottom row of matrix 12, the top face 18 of the "Lucite" rod 14 constituting the four areas marked "*c*" in FIG. 1. Correspondingly, pilot lamp 20 will furnish light to bent "Lucite" rod 22 when the "C" side of counter stage III is "on," and the top face 24 of "Lucite" rod 22 will then be illuminated and will light up the four areas designated "C" in matrix 12, thereby to register its distinctively different condition, from the (then) dark areas "*c*" constituted by the surface 18 in FIG. 2. One and only one of the two pilot lamps 16 and 20 will be "on" at any one time.

The second horizontal row in matrix 12 of FIG. 1 is constituted of the top faces 26, 28, 30 and 32 of light-conducting rods 34, 36, 38 and 40, which are illuminated in combinations by pilot lights 42 and 44. Thus, rods 34 and 38 are parts of a forked unit, effective to conduct light from pilot lamp 42 to the surfaces 26 and 30, when the side "*b*" of counter stage II is "on," whereas when the other side of counter stage II is "on," rods 36 and 40 (which are joined as a forked unit) will conduct the illumination from pilot lamp 44 to the surfaces 28 and 32. Each one of the surfaces 26 and 30 represent the two adjoining areas designated "*b*" in matrix 12 of FIG. 1, whereas surfaces 28 and 32 each represents the adjoining pair of areas designated "B" in that matrix. By like token, "Lucite" rods 46 and 48, which alternate across FIG. 2, will provide illumination from a suitable pair of pilot lights, not shown, for illuminating the areas designated "*a*" or "A" in the matrix 12 of FIG. 1. Only a single incandescent light need be furnished for all of the rods 46, by uniting them or by aiming the ends thereof remote from the display ends (shown) toward a single bulb. Where there may be too many rods for convenient arrangement for light pick-up from one bulb, two bulbs in series or in parallel may be substituted for the single bulb shown, at any one side of any counter stage. By like token, only a single pilot light, energized by the other side of counter stage I is necessary for illuminating the upper ends of all the rods 48. Such incandescent lamps may constitute the entire output load or part of the output load of each of the sides of the successive flip-flops, pilot lamps 16 and 20 representing the output point "*c*" and "C" of counter stage III in FIG. 1; and the other pilot lights 42 and 44 shown in FIG. 2 constituting the output points "*b*" and "B" of counterstage II, etc. The lamps may be normally short-circuited, and switched into the circuit during read-out times, if that should be desirable for any reason. Such an arrangement would help prolong the lives of the bulbs, where incandescent bulbs are involved. As a term of reference, faces 18, 24, 26, 28, etc., may be called read-out elements. It should be noted that the faces 18 and 24 each incorporates four read-out elements (as *c*, *c*, *c* and *c*) while faces 26, 28, 30 and 32 each incorporates two read-out elements (as *b* and *b*').

Figure 1A:
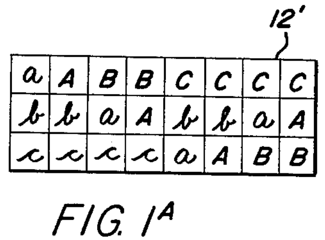
FIG. 1A is a modification of a portion of the apparatus in FIG. 1.

The matrix 12 of FIG. 1 may be constructed as shown in FIG. 2, being characterized by having all of the read-out elements "*a*" and "A" in a single row. In each column there is a distinctive combination of lower-case and upper-case read-out elements representing the points or sides of all the various counter stages. FIG. 1A demonstrates that it is not essential, broadly, that each row be identified with a particular counter stage as true of the matrix in FIG. 1. In FIG. 1A a modified matrix 12' is shown, in which there is a unique combination of lower-case and upper-case read-out elements in each of the different columns corresponding to each possible combination of the states of counter stages I, II, and III; but there is no identification of each horizontal row with any particular counter stage. Thus, the top and bottom rows of the matrix in FIG. 1A include read-out elements of each of the counter stages, and the center row includes read-out elements of stages I and II. Read-out matrix 12' makes interpretation more difficult than in FIG. 1, as will be recognized in connection with the discussion below of FIGS. 7 and 8, but the common concepts of FIGS. 1 and 1A are within the broader aspects of the invention.

The various light-conducting rods in FIG. 2, as rods 14, 22, 34, 46 are convenient ways of transmitting light from individual pilot lights to a number of elements in the read-out matrix. A separate lamp might be possibly used for each read-out element in the surface of matrix 12. However, by using plural light-conducting rods which fan out from an individual lamp, multiple areas as required by the matrix can be illuminated by individual pilot lights in the read-out points of the counter stages.

Figures 4, 5, 6:
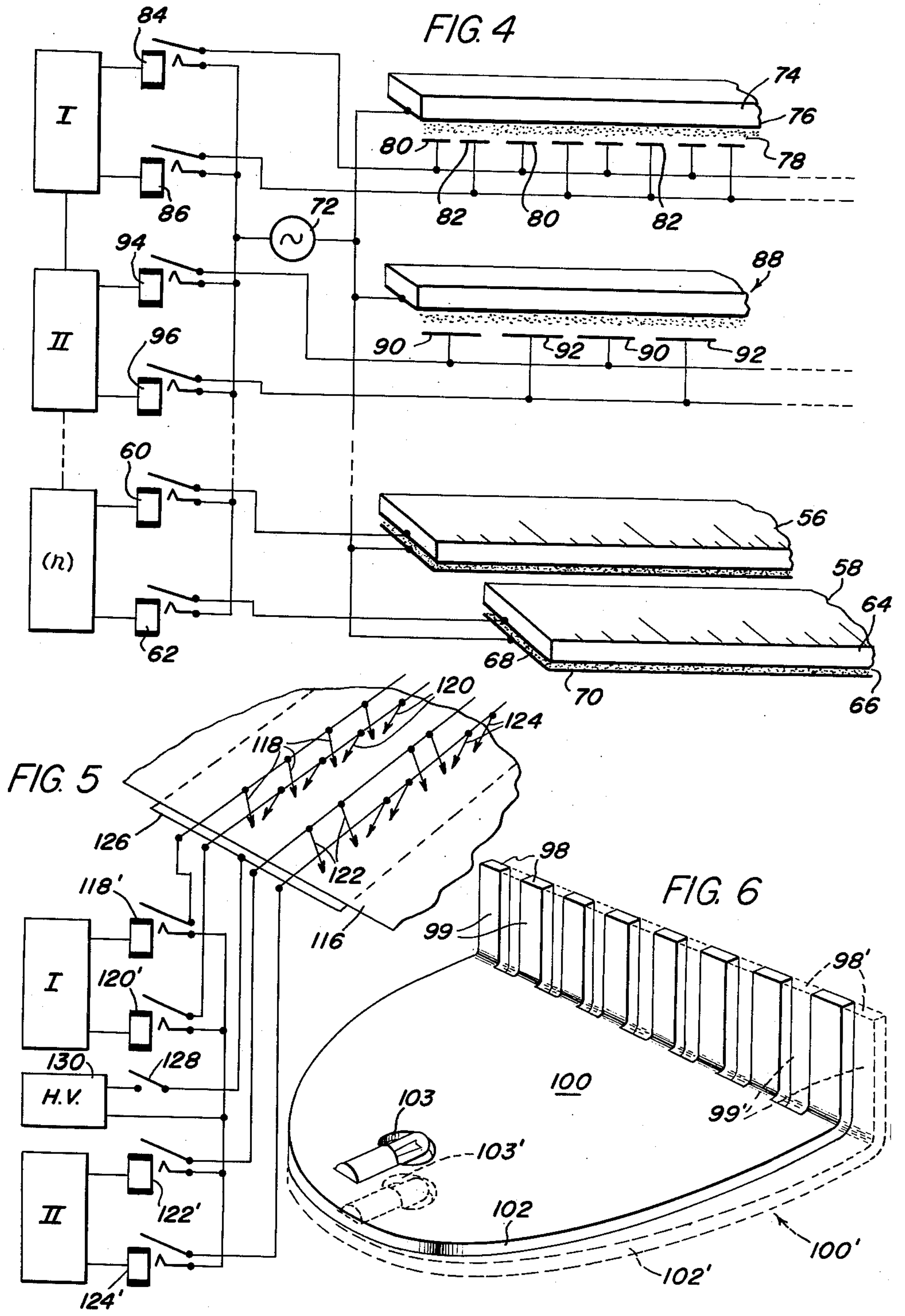
FIG. 4 and 5 are semi-physical diagrammatic representations of two forms of the apparatus of FIG. 3, including diagrammatic representations of physical alternatives for the read-out structure in FIG. 2.
FIG. 6 is a perspective of a read-out component useful in the embodiment of FIG. 2.

Pilot lamps 16 and 20, described as incandescent lamps, may be alternatively of neon type, or other suitable form; and they may also be of the electroluminescent type as shown in FIG. 4, described in greater detail hereinbelow.

In FIG. 3, a modification of FIG. 1 is shown, in which four binary counter stages I, II, III and IV are identified with the four horizontal rows of elements in the read-out matrix 50, a fifth counter stage V being identified with a pair of scales 52 and 54. Scale 52 has a series of scale markings 1–16, inclusive, and scale 54 has a series of scale markings 17–32, inclusive. The read-out elements "*a*" and "A," "*b*" and "B," "*c*" and "C" and "*d*" and "D," are to be rendered distinctive by lamps or other suitable read-out devices in the respective sides "*a*" and "A," etc. of the counter stages I, II, III and IV. Just as in the case of matrix 12, there is only one column of read-out elements all of which will be "on" for any particular combination of stages of the counter stages, there being sixteen possible combinations, as indicated by scale 52. However, stage V has two read-out points, and these selectively control the illumination (or effectiveness by other means) of scales 52 and 54. Thus, so long as the first side of stage V is "on," scale 52 is effective and the matrix 50 will select one of the numerals 1–16, depending upon which column has all of its read-out elements "on." When the counter stage V reverses its condition, its read-out side "E" will render scale 54 effective. This causes the matrix 50 to represent counts 17–32, inclusive, depending upon which of the columns in matrix 50 is made up of "on" elements. Scales 52 and 54 may be plates of Lucite with lamps below them, just as in the case of Lucite element 14 with its pilot light 16; and with the read-out faces.

The matrixes and the scales may be variously constructed so as to provide the desired read-out, the form in FIG. 2 being one preferred embodiment. FIG. 4 represents a second embodiment. In FIG. 4, the counter stages I, II . . . (*n*) represent the stages of a counter. The last stage is intended to selectively illuminate either of two different scales 56 and 58. Stage (*n*) will energize the relay 60 at its first read-out point effective to "turn on" scale 56. When the condition of stage (*n*) is reversed by the number of counts read into the counter, relay 62 will be energized and will render scale 58 effective, turning scale 56 "off" and scale 58 "on." Each of the scales includes a plate of glass 64 having a lower surface 66 that is both transparent and conductive, a layer of electroluminescent phosphor 68, and a lower electrode 70. When the contacts of relay 60 or 62 are closed, a signal from alternating current source 72 is impressed between electrodes 66 and 70, causing the phosphor 68 to light up.

The other stages in the cascade of binary counter stages I, II, etc. similarly utilize electroluminescent light sources, in place of the form of read-out in FIG. 2. Thus, in FIG. 4 the glass element 74 has a conductive film 76 on its lower face, this film being transparent, and a phosphor 78. Below the phosphor there is a series of electrodes 80 and 82 which alternate along the length of glass element 74. All of the elements 80 are connected together for energization by alternating current source 72 when relay 84 at the first output side of relay stage I is closed. Electrodes 82 are arranged to be energized by alternating current from source 72 when relay 86 at the other side of counter stage I is energized. Each of the electrodes 80 in FIG. 4 is of an area that will illuminate a portion of the glass strip 74 when electrodes 80 are energized relative to film 76, electrodes 80 thereby illuminating areas corresponding to those labeled "*a*" in FIG. 3 and correspondingly, electrodes 82 when energized illuminate portions of electroluminescent phosphor 78 on the glass strip 74 corresponding to the areas "A" in FIG. 3. By like token, the electroluminescent element 88 will have areas illuminated selectively by electrodes 90 or 92 when one of the relays 94 or 96 is "on," in dependence on the state of counter stage II. Each electrode 80 with the opposed electrode 76 and the interposed phosphor might be thought of as an individual lamp; and electrodes 80, 82, 90, 92, etc. may be deposited as printed-circuit metal films in the required patterns for the read-out matrix, such as matrix 50.

FIG. 6 shows an extension or alternative to the physical form of read-out construction like that in FIG. 2 where multiple "Lucite" light-directors are provided between each individual pilot light and the multiple elements constituting the read-out face of the matrix. FIG. 6 shows the alternative only as applied to the top row of read-out matrix 12 in FIG. 3. A series of areas 98 are shown, constituting read-out elements at the ends of teeth or fingers 99 extending integrally from a "Lucite" sheet 100. A parabolic edge 102 of sheet 100 is disposed to redirect light along fingers 99 from a light bulb located at the focus 104 of the parabola. Internal reflection is relatively efficient, even for relatively rough surfaces along the edge 102. Even where fingers 99 are formed with saw-cuts, and even when there are as many as sixteen fingers per inch (interdigitated with sixteen additional fingers of a companion member) there is little loss or pick-up of light at the edges of fingers 99. Ends 98 are suitably illuminated, even in high levels of ambient light, by means of a single one-watt incandescent pilot bulb, set in hole 103 with its base aimed away from fingers 99.

The shape of the reflecting edge 102 need not be a true parabola, and location of the lamp at the true focus is not critical, because effective illumination can be attained with approximations, particularly with a rough-cut surface and with metallized coating.

The matrix pattern is visually presented in each of the above forms. However, the matrix may be of a form to record the conditions of the read-out elements mechanically or electrostatically, or by other means. One such technique for read-out recording of the presented pattern of read-out elements is represented in FIG. 5, which does not depend on illumination of the matrix.

Electrostatic electrodes effect the recording in the embodiment of FIG. 5. A sheet of voltage-sensitive "teledeltos" paper 116 is interposed between pointed electrodes 118, 120, 122 and 124 above the paper and a supporting plate electrode 126. Electrodes 118 and 120 have their points distributed in a row, comparable to the *a*–A–*a*–A . . . row in FIG. 3. Electrodes 122 and 124 have their ponts distributed in pairs along a line to constitute the second row of read-out elements *b*–*b*–B–B . . . of FIG. 3. Only two illustrative counter stages I and II are shown, forming part of a larger series of stages. Counter stages I and II have relays bearing primed numerals corresponding to the electrodes connected to them. When the count in the counter is to be read out, switch 128 is closed to connect high voltage from supply 130 to those pointed electrodes whose relays are energized. This produces a corresponding pattern of recorded impressions on the voltage-sensitive paper 116. Electrodes 118, etc. thus constitute elements of a directly recording read-out matrix. Each row in the recorded matrix will contain impressions representing one of the two sides of the related counter stage. If neither set of recording elements in a row functions, or if both function, prominent evidence of misfunctioning is provided.

While the read-out elements in FIG. 5 are not themselves adapted to form a visual display, the impression they produce is a reproduction of the matrix elements. Conversely, the visual displays in FIGS. 2 and 4, for example, will produce a record, simply by photographing them. In this sense, each element in each of the matrices 2, 4 and 5 is properly a recording matrix element.

Figure 9:
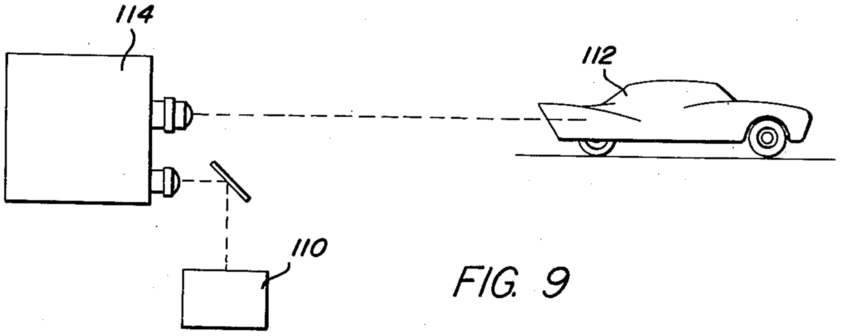
FIG. 9 is a diagram illustrating a practical application of the novel read-outs and counter.

FIG. 9 illustrates a particularly suitable and practical application of a read-out as in FIGS. 2 and 4, arranged to provide recorded impressions photographically.

Figure 7:
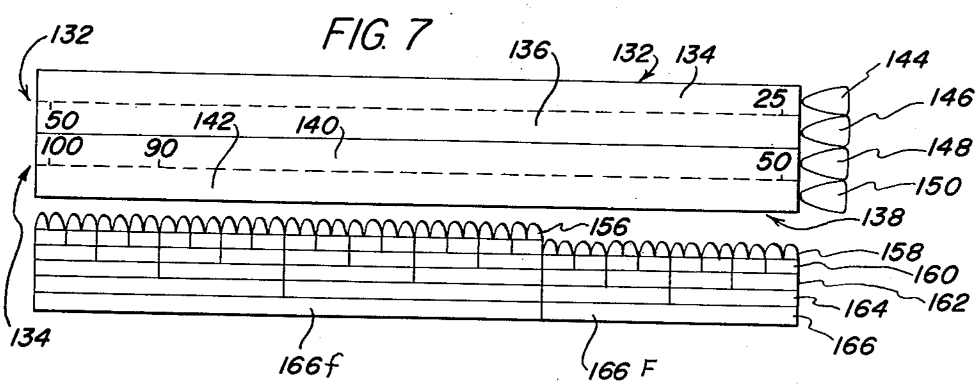
FIG. 7 is the front view of a read-out of larger proportions than that in FIG. 3, employing read-out elements of the forms in FIGS. 2, 4 or 6.

Unit 110 represents a multi-stage binary counter, which has a read-out on its upper face in the form shown in FIG. 7, this being of a visual display type such as that of FIG. 2 or FIG. 4 for example. Camera 114 is arranged to photograph a vehicle 112 so as to record its license plate. The camera is also arranged to photograph the read-out on an area of the film adjacent the image of the vehicle. The counter may be part of a speed-measuring apparatus of a form known per se having a gate including "start" and "stop" controls and a "clock" pulse generator that supplies pulses to the counter after the "start" control opens the gate and until the "stop" control shuts it. The "start" and "stop" controls may be spaced apart a measured distance along the traffic lane. In this way, the counts registered represent the speed of the vehicle.

In an example, a clock pulse generator of 2500 pulses per second may be associated with a multi-stage binary counter controlled by pressure switches separated very nearly 36 inches apart, in a speed measuring system that registers speeds above 25 miles per hour as in the scales in FIG. 7. An upper unit 132 has a pair of scales 134 and 136 whereas a lower unit 138 has a pair of scales 140 and 142. Scales 134 and 136 jointly cover the 25–50 mile-per-hour range. Scale 140 covers the 50 to 100 mile-per-hour range and scale 142 covers still higher speeds.

Indicators 144, 146, 148 and 150 are shown at the right-hand ends of these scales. Below is a read-out matrix 152. Unit 132 is arranged to be lit up by a lamp connected to one side of the highest-order binary stage of the counter while unit 138 is similarly lit by a lamp at the other side of that counter stage. This is the same arrangement as in FIG. 3 where scales 52 and 54 are selectively illuminated. Indicators 144 and 150 are both lit by one lamp (as with a "Lucite" fork) or by two lamps at one side of the next lower stage of the counter and indicators 146 and 148 are likewise lit by a lamp or lamps at the other side of that next-lower counter stage.

Matrix 152 has six rows 154, 156, 158, 160 and 162 of read-out elements, and requires six additional binary counter stages. Consequently, the read-out in FIG. 7 will interpret the count registered in an eight-stage binary counter.

The read-out converts the count to miles-per-hour, a non-linear inverse function of the number of counts registered by the counter. If matrix 152 were constructed to provide a full 64 significant output points, the miles-per-hour scale at the right-hand end might be spread out more than may be desired because of the non-linearity of the function involved. Matrix 152 is modified to reduce this effect. In the illustrated matrix only 48 read-out points are made available. The top row 156 of read-out elements extends along only the left-hand portion of the matrix, equal to the extent of read-out element **166*f* of the bottom row 166 of read-out elements. No read-out elements 156 are provided above element 166F. Instead, read-out points above element 166F are provided by the read-out elements 158 of the counter stage adjacent that which illuminates elements 156, sixteen read-out points being provided by elements 158 additional to the 32 read-out points of elements 156, for a total of 48 read-out points or columns. This provides a useful demonstration that, despite the count capacity (equal to 64) of the six binary stages that determine the display pattern of matrix 152**, the number of read-out points of the matrix may be reduced as circumstances may warrant, to 48 in this case.

Figure 8:
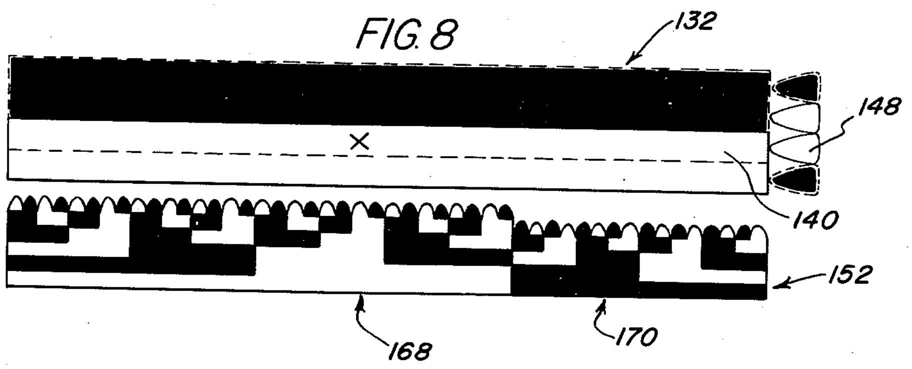
FIG. 8 is another view of the read-out of FIG. 7, demonstrating the nature of the display effected.

As described in connection with FIGS. 1 and 3, half of the areas in each row of read-out elements will be illuminated while the others remain dark. FIG. 8 illustrates the effect when the read-out of FIG. 7 is in operation. Read-out scales 132 are dark; and since element 148 is "on," read-out scale 140 is the significant one to watch. In matrix 152, a "pyramid of light" 168 may be found, whose apex is directly in vertical alignment with the read-out value "X" in scale 140. Parenthetically, it may be observed that if the opposite convention were adopted in wiring the counter and lights of the read-out, a dark pyramid as at 170 might be adopted as providing the significant read-out point.

It has been assumed that the counter for the read-out of FIG. 7 is a straight-forward sequence of eight binary stages, the most economical as to components required. However, it is entirely feasible to omit indicators 144, 146, 148 and 150 and to provide separate scales 134, 136, 140 and 142, each with its own lamp, if a four-stage ring counter were used in place of the two binary stages employed for the scales 132 and 138 and for the indicators shown.

It has been mentioned above that verifying the soundness of the read-out is readily achieved. This is true of each of the above embodiments, for in case of lamps, electrodes, electroluminescent areas and so forth, all may be simultaneously energized by suitable switching. The instant observation in FIG. 8, for example, that all the areas light up provides instant evidence of complete operativeness and the failure of any area to light up instantly leads to the defective lamp. Likewise, in FIG. 3 the relays may all be energized simultaneously, and all the electrodes should then record if operative. If not, the defective electrodes will be readily isolated.

It will be evident that various changes, varied applications and numerous substitutions will readily be suggested by this disclosure of a few embodiments of the invention. It is therefore appropriate that the invention should be broadly construed in accordance with its full spirit and scope

What is claimed is:

1. A read-out for series-connected binary stages wherein each stage has first and second output points that are in mutually opposite conditions at all times, the information contained in the binary stages being represented by the combination of conditions of said output points, said read-out including a read-out scale, and a plurality of read-out elements arranged in rows along said scale and in columns transverse to the scale, said read-out elements having means to condition them contrastingly in groups to represent the information contained in the binary stages, each column having one read-out element identified with each of said stages, half of said read-out elements being identified with the first read-out points of said binary stages and the other half of said read-out points being identified with the second read-out points of said binary stages, the thus identified read-out elements of the different binary stages being differently distributed along said scale so as to provide unique combinations of contrastingly conditioned read-out elements in the respective columns.

2. In combination, a read-out and a counter including a series of binary stages wherein each stage has first and second output points that are in mutually opposite conditions at all times, the information contained in the counter being represented by the combination of conditions of said output points, said read-out including a scale and a plurality of read-out elements of a type individually adapted to record its condition arranged in rows along the scale and in transverse columns, the read-out elements of the first row farthest from the scale being divided into two groups, and oppositely conditioned by the respective output points of one binary stage, the read-out elements in the second, next-adjacent row being divided into four groups with two of the four groups oppositely conditioned by the output points of the next binary stage of the series and arranged in columnar alignment with each of said groups of first-row read-out elements, and each succeeeding row of read-out elements being similarly divided into half as many read-out elements per group as in the preceding row and each group in a row being oppositely conditiontd from the adjoining group or groups of that row by connection to the read-out points of a respective binary stage corresponding to that row.

3. A read-out matrix having a series of read-out elements fixedly disposed in a first row and having means to energize alternate elements alike and additional means to energize the remaining elements of that row alike, a second row of fixedly disposed read-out elements each twice as wide as those of the first row and each aligned with two elements of that first row, means to energize alternate read-out elements of the second row alike and additional means to energize the remaining, intervening elements of the second row alike, and further successive underlying rows of read-out elements, each element being twice as wide as the elements in the overlying row, means to energize the alternate elements of each row alike and means for energizing the remaining elements of that row alike.

4. A read-out matrix in accordance with claim 3 wherein each element is a recording electrode.

5. A read-out matrix in accordance with claim 3 wherein said elements of each row are portions of two electroluminescent lamps subdivided for energization as aforesaid.

6. A read-out matrix in accordance with claim 3, wherein said elements are areas of a light-emitting face and wherein said energizing means are lamps having selective means for illuminating said areas in predetermined groups.

7. A read-out matrix, in accordance with claim 6 wherein said selective means for each row is in the form of light-guiding material having multiple fingers arranged to be illuminated by a lamp, said fingers interdigitated with other fingers of light-guiding material arranged to be illuminated by another lamp.

8. A read-out matrix comprising successive rows of read-out elements, each row having interconnected light-guiding fingers, the first row having narrow fingers, each succeeeding row having fingers of twice the width of the fingers in the preceding row and aligned with two such fingers.

9. A read-out matrix including rows and columns of read-out areas, one row being divided into two and each area thereof having a lamp and said lamps having energizing means to light one and maintain the other dark, each succeeding row having two areas above each area in the underlying row and the areas in each row having illuminating means for alternate ones of said areas in the row and other illuminating means for the areas of that row between said alternate ones and means for insuring energization of either one of said illuminating means or said other illuminating means in any one row, whereby a pyramid of illuminated areas will be produced having its apex at the read-out point.

10. In combination, a counter and a read-out therefor, said read-out including at least four scales, a binary counter means arranged to suppress a pair of said scales and to render the other pair effective, a plurality of indexes including one index adjacent each scale, and further binary counter means arranged to suppress one index adjacent each pair of scales while rendering the other index adjacent each pair of scales effective, said binary counter means and said further binary counter means being arranged in series relation.

11. In combination, a counter and a read-out therefor, including a series of binary stages, a matrix of read-out elements controlled by said binary counter stages and arranged in rows and columns for providing a unique read-out column corresponding to the ranges of values to be indicated, plural scales adjacent said matrix, and means forming part of the counter for selectively rendering one of said scales effective while suppressing another.

12. The combination, in accordance with claim 11, including four scales arranged to be selectively effective or suppressed in pairs, a binary counter stage in said series operative to determine which pair of stages shall be effective, four indexes adjacent said scales, respectively, and arranged in pairs with one index of each pair adjacent each of said pairs of scales and means including a further binary stage in said series of stages effective to render one of said pairs of indexes effective while suppressing the other.

13. A read-out including plural rows of read-out devices arranged in columns to form a matrix, the lowermost row having two relatively wide devices and a pair of devices in each succeeding row occupying the space over each device in the preceding row, each of said devices having means for enabling it to record, and alternate ones in each row of said devices having common control means for effecting concurrent recording to the exclusion of the other devices of that row.

14. A read-out in accordance with claim 13, wherein a scale is disposed along said rows of devices.

15. A read-out matrix for a multiple stage counter, wherein each stage of the counter has two sides, the two sides at all times being in mutually opposite conditions, said read-out matrix including a pattern of read-out elements arranged in rows and columns, there being as many rows as there are counter stages controlling the matrix and there being as many columns as the count capacity of the counter stages, each column including a read-out element related to one and only one side of each of said counter stages, the combination of read-out elements in each column being uniquely representative of a count, and means causing the read-out elements related to one side of each stage of said counter to record individually.

16. A read-out matrix comprising plural rows of light-conducting fingers, each row having fingers interconnected in first and second groups, the interconnected fingers of the first group alternating in the row with the fingers of the second group, at least one group of fingers extending integrally from a sheet of light-conducting material having the edge thereof remote from the fingers thereof curved at least approximately as a parabola and having an opening disposed about the focus of the parabola for locating a lamp thereat.

17. A read-out matrix having rows and columns of read-out elements fixed in relation to each other, said rows having an equal number of read-out elements and said columns having an equal number of elements, the elements of each row being divided into successive groups, the number of elements in each group of each row being equal to $2^{n-1}$, $n$ being the number of the row when counting along a column, and respective means connected with each row of elements adapted to condition the successive groups thereof oppositely.

18. A unitary read-out element formed of a light-conducting sheet having generally parallel read-out fingers at one edge and the opposite edge being convexly curved, and a formation within the curve and near the peak thereof for receiving and locating a lamp in position for effective illumination of said fingers.

19. A unitary read-out body of light-conducting material having a read-out portion, an approximately parabolically curved externally convex surface opposite said read-out portion, and a lamp-receiving and locating cavity within said curved surface, for conducting light from a lamp in said cavity divergently toward said curved surface to be internally reflected and redirected as substantially parallel rays of light toward said read-out portion.

References Cited in the file of this patent

UNITED STATES PATENTS

| | | |
|---|---|---|
| 2,540,442 | Grosdoff | Feb. 6, 1951 |
| 2,561,508 | Gregorie et al. | July 24, 1951 |
| 2,619,068 | Malheiros et al. | Nov. 25, 1952 |
| 2,763,432 | York | Sept. 18, 1956 |
| 2,765,458 | Hoover | Oct. 2, 1956 |
| 2,813,266 | Kay et al. | Nov. 12, 1957 |

FOREIGN PATENTS

| | | |
|---|---|---|
| 36,887 | Italy | Sept. 8, 1938 |